United States Patent Office 3,585,254
Patented June 15, 1971

3,585,254
SELF-EXTINGUISHING POLYESTER RESINS
AND PROCESS THEREFOR
Donald A. Buck, New City, N.Y., assignor to
Reichhold Chemicals, Inc., White Plains, N.Y.
No Drawing. Filed Nov. 18, 1969, Ser. No. 877,834
Int. Cl. C08g *17/12;* C08f *21/02*
U.S. Cl. 260—869
7 Claims

ABSTRACT OF THE DISCLOSURE

A polymerizable blend of (A) a polymerizable linear polyester resin and (B) a polymerizable monomer containing a terminal ethylenic unsaturation; and the process of making same.
(A) is prepared by reacting a glycol of the $C_2$–$C_{10}$ range with a cycloolefinic acid, brominating the polyester thus formed and reacting resultant product with an alpha-beta unsaturated dicarboxylic acid to an acid value of 30 or less.

---

The invention concerns novel polymerizable composition comprising a polymerizable mixture of an unsaturated linear polyester, which is also known in the art as an unsaturated alkyd, and an unsaturated crosslinking agent. This polymerizable mixture includes a component which imparts self extinguishing properties to the polymerized mixture.

More particularly the invention relates to a polymerizable blend of (A) a polymerizable linear polyester resin and (B) a polymerizable monomer containing a terminal ethylenic unsaturation; and the process of making same.

(A) is prepared by reacting a glycol of the $C_2$–$C_{10}$ range with a cycloolefinic acid, brominating the polyester thus formed and reacting resultant product with an alpha-beta unsaturated dicarboxylic acid to an acid value of 30 or less.

The production of infusible, insoluble polyester resins which are flame retardant and have high resistance to heat is of considerable commercial importance.

For instance, castings, moldings, foamed articles on laminated structures bonded by polyester type resins are for many uses desirably resistant to fire and/or self extinguishing. Structural members such as pipes, wall coverings, panels, ash trays, etc. are further illustrations where flame retardancy and/or self extinguishing properties are desirable.

The production of flame resistant unsaturated polyester resins is known. E.g. an approved method is the use of the so called Het acid which is 1,4,5,6,7,7-hexachloro-bicyclo[2,21]-5-heptene-2,3-dicarboxylic acid or its anhydride. This compound is built into the polyester by esterification. However, it is generally necessary to add phosphoric compounds in order to obtain the desired properties. Another method of preparing flame resistant properties comprises mixing a suitable polyester resins with fire retardant additives such as antimony trioxide or halogenated compounds such as halogenated paraffine or halogenated phosphates etc. However, lack of color stability limits the range of utility. Other properties leave much to be desired. And still another way to impart fire retardancy to polyester resin is to build terminally located phosphonate groups into the mixture, as described in U.S. Pat. 3,150,208. However, due to extended reaction time necessary for transesterification the lack of stability manifests itself in mediocre color and premature gelation.

Prior teachings on a type of resin disclosed hereinbelow has involved direct bromination of a linear unsaturated polyester. This method is disclosed in the German Pat. No. 1,263,297. According to this disclosure the polyester is formed, subsequently diluted with an appropriate inert solvent to maintain low temperature fluidity, and then brominated. After bromination the inert solvent must be removed with heat and vacuum. Reducing this method to commercial practice is both expensive and complicated. The design of requisite glass lined equipment to operate at such widely divergent temperatures, within reasonable time limits, is quite complex. The need for solvent handling, recovery and storage facilities adds appreciably to operating expenses.

In addition, the removal of the dilution solvent via heat and vacuum subsequent to bromination is both cumbersome and undesirable. Without heat, solvent recovery by vacuum alone is nearly impossible because of high viscosity and foaming problems. The combined use of heat and vacuum results in varying degrees of degradation accompanied by elimination of HBr with the end result of poor color, clarity and stability in the finished product.

It is therefore an object of this invention to develop a novel polyester system with fire retarding and/or self extinguishing properties.

Another object of this invention is to develop a process whereby said fire retarding and/or self extinguishing is accompanied through bromination.

It is still another object of this invention to provide a process whereby said bromination is accompanied without addition of inert solvents as reaction vehicles.

It is yet another object of this invention to develop a process for the preparation of a self extinguishing resin which retains color, clarity and stability and has superior fire extinguishing properties.

Still further objects and the entire scope of applicability of the present invention will become apparent from the detailed description given hereinafter.

Surprisingly, it has now been found that these objects can be achieved by brominating a partial ester, in that esterification is carried out with 1 mol of a cycloolefinic acid per 2 mols of glycol before bromination and subsequently after bromination finished with one mole of an alpha-beta unsaturated dicarboxylic acid.

In a typical example the glycols and the tetrahydrophthalic anhydride are first reacted at about 200° C. until the acid value is less than about 4. This results in a low polymer which is fluid at room temperature. This low polymer is then brominated at a temperature of about 30–70° C. at a rate of 0.9 mole bromine per mole of tetrahydrophthalic anhydride. After the completion of such bromination the temperature is then increased to about 100° C. whereupon maleic anhydride is added and the temperature is carried on upward to a maximum of about 175° C. and continued at that temperature until an acid value of less than about 30 is reached.

The said glycols considered as starting materials or as reactants for this reaction include saturated and unsaturated aliphatic glycols, such as ethylene glycol, propylene glycol-1,2, piperylene glycol-1,3, pentane diol-1,5, the hexyleneglycols, neopently glycol 2-butene-1,4 diol, 2-methyl-3-butyn-2-ol etc. They also include dihydroxy polyethers, such as diethylene glycol, dipiperylene glycol, triethylene glycol and also the higher poly glycols of waxy consistency. The above are mentioned as illustrative only, not by way of limitation.

Suitable cyclo-olefinic acids are tetrahydrophthalic acid, its anhydride, nadic acid, its anhydride, nucleus chlorinated or brominated derivatives thereof, alkyl derivatives thereof and the like and mixtures thereof. However, outstanding results are achieved by using tetrahydrophthalic anhydride. Therefore, this should be considered the preferred acid.

The group of polymerizable monomers or crosslinking agents includes the vinyl monomers, such as styrene, vinyl toluene, diallyl phthalate triethylcyanurate, diallylmaleate, diallyl fumarate, the isomers of dichlorostyrene, etc. and mixtures thereof. The group further includes methylmethacrylate, ethyl-ethacrylate, methylacrylate, ethylacrylate etc., and mixtures thereof. The preferred monomer however is styrene on account of outstanding properties achieved through its use.

The ethylenically unsaturated alpha-beta dicarboxylic acids considered as starting materials may include among others maleic acid, fumaric acid, aconitic acid, itaconic acid, mono chloro-maleic acid, etc. and the corresponding anhydrides of the cis acids and mixtures thereof. These ethylenically unsaturated dicarboxylic acids may be partially replaced with either saturated carboxylic acids or those dicarboxylic acids which contain only benzenoid unsaturation. This group includes among others adipic acid, azelaic acid, sebacic acid, dimerized fatty acids, phthalic acid, isophthalic acid, terephthalic acid, tetrahydrophthalic acid, tetrachlorophthalic acid, chlorendic acid, hexahydrophthalic acid, etc. or mixtures thereof as well as the anhydrides of those acids which are capable of forming it. Up to 10 moles of those dicarboxylic acids having no ethylenic unsaturation may be used for each mol of ethylenically unsaturated dicarboxylic acid containing no unsaturation other than benzenoid but such molecular ratio is preferably between 5:1 and 1:5.

A preferred procedure comprises esterifying 2 moles of the selected glycols with 1 mol of the cyclo-olefinic acid at a temperature range from about 150° C. to about 230° C. The preferred range however should be about 90° C. to about 200° C., because superior results are obtained by using this temperature range. The esterification should take place in a reaction vessel which is equipped with heating and cooling means, thermometer, an agitator and means for inserting an inert gas stream and means for removing the water of esterification.

The above cited reaction should preferably continue until an acid value of 4.0 has been attained, though a value of 0–30 would also achieve satisfactory results. The addition of bromine should be done dropwise under reflux maintaining a maximum pot temperature of about 70° C. After addition of bromine is completed, it is preferable though not essential to rais the temperature to approximately 100° C. and to add the maleic anhydride. The reaction temperature should then be gradually increased to about 175° C. and continued under removal of water until the acid number is about 30.

In order to prevent premature gelation during manufacturing and storage it is essential to add hydroquinone as an inhibitor. About 100 parts per million is required. This addition should be effected at about 90° C. Other well known stabilizers of the phenolic or quinoid type may be suitable such as quinone and tertiary butyl catechol and the like.

The completed resin is then blended to the desired non-volatile concentration with the appropriate quantity of styrene monomer. To guard against the possibility of trace quantities of HBr being present in the finished resin, or of being generated during subsequent storage, about 0.5% of an HBr scavenger is preferably added, such as propylene oxide and the like scavengers.

The invention is further illustrated, but not limited by the following examples.

EXAMPLE I 1.84 mols of ethylene glycol, 0.3 mol of diethylene glycol and 1 mol of tetrahydrophthalic anhydride are placed in a reaction flask, provided with a heating mantle, an agitator, an inert gas sparge tube, thermometer and a condenser. This mixture was then heated slowly with agitation under an inert gas atmosphere, driving off water of reaction until the pot temperature has reached 190°–200° C. and the acid value is less than 4. The reaction product is then cooled to room temperature and 0.9 mol of bromine is added dropwise, under reflux, maintaining a maximum pot temperature of about 70° C. by intermittent cooling.

When the bromine addition is complete, the pot temperature is increased to about 100° C. and 1 mol of maleic anhydride is then added. Reaction temperature is subsequently increased to a maximum of about 175° C. with the continuous removal of water, and held until the acid number is less than 30.0 and Gardner-Holdt bubble viscosity of T–U has been obtained. The reaction product is then inhibited with 100 parts per million of hydroquinone, cooled to 90° C. and reduced to 65–70% non-volatile with styrene, containing 50 p.p.m. of 4-tertiary butyl catechol based on the combined weight of resin and styrene. 0.5% of propylene oxide is then added, based upon the weight.

EXAMPLE II

A polymerizable blend was prepared according to the instructions of Example I, except that 1 mol of 3,6-endomethylene 1,2,3,6-tetrahydro-cis-phthalic anhydride was used instead of 1 mol of tetrahydrophthalic anhydride. It was subsequently brominated and diluted with styrene monomer.

EXAMPLE III

A polymerizable blend was prepared according to the instructions of Example I, except that 1 mol of methyl-tetrahydrophthalic anhydride was used instead of 1 mol tetrahydrophthalic anhydride. It was subsequently brominated and diluted with styrene monomer.

EXAMPLE IV

The polymerizable blend of Example I was cured with 1% of benzoylperoxide and subsequently tested for flame resistance. It proved to be non-burning according to ASTM D–635. Ignition was 78.5 sec. and burning time 35 sec., according to a modified procedure of ASTM D–229, as indicated in Table A.

To further illustrate the advantages of the resins, results from flame resistance tests are compared with those obtained from conventional resins and these results are compiled in Table A.

It becomes evident from this table that the resin of this invention, which is identified as Resin 2 in this table, shows superior flame resistance, when compared with conventional resins.

TABLE A.—FLAME RESISTANCE

| | ASTM D–635 | Modified ASTM D–229 [1] | | Non-volatile | Viscosity, cps. | Percent halogen |
|---|---|---|---|---|---|---|
| | | Ignition (sec.) | Burn (sec.) | | | |
| Resin 1 of Table B | Burns | 100.00 | 498.0 | 64.75 | 365 | 0.0 |
| Resin 2 of Table B | NB [2] | 78.50 | 35.0 | 65.5 | 365 | [3] 18.2 |
| Resin 3 of Table B | NB | 67.25 | 40.75 | 66.0 | 500 | [4] 26.1 |
| Resin 4 of Table B | S.E.[5] | 90.50 | 217.25 | 67.9 | 425 | [4] 23.8 |
| Resin 5 of Table B | S.E. | 81.75 | 70.00 | 66.0 | 300 | [3] 18.9 |

[1] Procedure of ASTM D–229 but using ½ x 5″ fiber glass reinforced rods.
[2] Non-burning by this test.
[3] Bromine.
[4] Chlorine.
[5] Self-extinguishing by this test.

TABLE B

| No. | Resin composition [1] (mole ratio) | | | | | | | | | |
|---|---|---|---|---|---|---|---|---|---|---|
| | EG | DEG | PG | THPA | Het acid | TCPA | TBPA | MA | PA | Br$_2$ |
| 1 | 1.8 | 0.3 | | 1.0 | | | | 1.0 | | |
| 2 | 1.8 | 0.3 | | 1.0 | | | | 1.0 | | 0.9 |
| 3 | 2.25 | 0.3 | | | 1.5 | | | 1.0 | | |
| 4 | 2.65 | 0.5 | | | | 2.0 | | 1.0 | | |
| 5 | | | 2.25 | | | | 0.4 | 1.0 | 0.6 | |

[1] These polyester resins were diluted to about 65% non-volatile with styrene monomer and the resultant polymerizable blends were then cured with 1% of benzoyl peroxide.

NOTE.—EG=Ethylene glycol; DEG=Diethylene glycol; PG=Propylene glycol. THPA=Tetrahydrophthalic anhydride; TCPA=Tetrachlorophthalic anhydride; TBPA=Tetrabromophthalic anhydride; MA=Maleic anhydride; PA=Phthalic anhydride.

What is claimed is:

1. A process for making a polymerizable resin composition which consists essentially of reacting (a) a member of the group consisting of the glycol series $$HO\text{---}(CH_2)_n\text{---}OH$$

and the glycol series $HO\text{---}(CH_2)_nO\text{---}(CH_2)_n\text{---}OH$, wherein $n$ is a whole number within the range of 2–10, with (b) a cyclo-olefinic dicarboxylic acid selected from at least one member of the group consisting of tetrahydro orthophthalic acid, tetrahydrophathalic anhydride, ester forming derivatives thereof, 3,6-endo-methylene 1,2,3,6-tetrahydro-cis-phthalic acid, 3,6-endo-methylene 1,2,3,6-tetrahydro-cis-phthalic anhydride, ester forming derivatives thereof and their mixtures to form a product having an acid number within the approximate range of 0 to 30, the molar ratio of the glycol (a) to the acid (b) being about 2 to 1, then reacting the reaction product of (a) and (b) with (c) bromine at a maximum temperature of about 70° C. during the addition of said bromine to form an addition product and reacting said addition product with (d) about 1 mole of an ethylenically alpha-beta unsaturated dicarboxylic acid per 2 moles of glycol and mixing the resulting polyester with a polymerizable monomer containing terminal ethylenic unsaturation.

2. The process according to claim 1, wherein (a) is a member of the group consisting of ethylene glycol, diethylene glycol, propylene glycol, dipropylene glycol and mixtures thereof.

3. The process according to claim 1, wherein (d) is a member of the group consisting of maleic acid, its anhydride, fumaric acid, aconitic acid, itaconic acid, their ester forming derivatives and mixtures thereof.

4. The process according to claim 1, where (a) and (b) are reacted at a temperature ranging from about 150° to about 230° C., until an acid value of from about 0 to 30 has been reached.

5. The process according to claim 4 where the bromine addition product is reacted with (c) at a temperature of not higher than about 175° until an acid value of at least 30 has been obtained.

6. The process according to claim 1 wherein the polymerizable monomer is a member of the group consisting of styrene, vinyl toluene, diallyl phthalate, triallylcyanurate, triallylcitrate, diallylmaleate, diallylfumarate and mixtures thereof.

7. The process according to claim 6, wherein the polymerizable monomer is styrene.

References Cited

UNITED STATES PATENTS

| 2,550,744 | 5/1951 | Wilder et al. | 260—341 |
| 3,004,003 | 10/1961 | Batzer | 260—75 |

FOREIGN PATENTS

| 1,263,297 | 3/1968 | Germany. |

OTHER REFERENCES

Batzer et al., Makromol. Chem. 44, 179, 188, 192 (1961).

MELVIN GOLDSTEIN, Primary Examiner

U.S. Cl. X.R.

260—2.5, 75